(12) United States Patent
Balan et al.

(10) Patent No.: US 7,803,473 B2
(45) Date of Patent: Sep. 28, 2010

(54) INTEGRATED POWER PLANT AND SYSTEM AND METHOD INCORPORATING THE SAME

(75) Inventors: Chellappa Balan, Niskayuna, NY (US); Daniel Preston Smith, Ballston Spa, NY (US)

(73) Assignee: General Electric Company, Niskayuna, NY (US)

( * ) Notice: Subject to any disclaimer, the term of this patent is extended or adjusted under 35 U.S.C. 154(b) by 839 days.

(21) Appl. No.: 10/881,407

(22) Filed: Jun. 30, 2004

(65) Prior Publication Data

US 2006/0003207 A1    Jan. 5, 2006

(51) Int. Cl.
  *H01M 8/04*   (2006.01)
  *H01M 8/12*   (2006.01)
(52) U.S. Cl. .............................. 429/26; 429/13; 429/17; 429/20; 429/34
(58) Field of Classification Search .................... 429/12, 429/13, 17, 19, 20, 26; 60/204
See application file for complete search history.

(56) References Cited

U.S. PATENT DOCUMENTS

| 5,482,791 A | 1/1996 | Shingai et al. ................. 429/23 |
| 5,955,039 A | 9/1999 | Dowdy ......................... 422/189 |
| 2004/0131912 A1* | 7/2004 | Keefer et al. .................... 429/34 |

* cited by examiner

*Primary Examiner*—Patrick Ryan
*Assistant Examiner*—Ben Lewis
(74) *Attorney, Agent, or Firm*—Patrick K. Patnode

(57) ABSTRACT

A system and method for producing electricity is described. The system comprises a fuel cell assembly. The system may comprise a steam turbine and a generator. The fuel cell assembly may be used to provide heat to produce the steam used to power the steam turbine. The system may comprise a gasifier that is operable to produce a fuel for use in the fuel cell assembly. The system may comprise an air separation unit that is operable to supply oxygen to the gasifier and to the fuel cell assembly for reaction with the fuel. The oxygen that is not reacted in the fuel cell assembly may be recirculated through the fuel cell assembly. Spent fuel from the fuel cell assembly may be recirculated through the fuel cell assembly. A carbon dioxide removal system may be used to remove carbon dioxide from the fuel upstream of the fuel cell.

6 Claims, 1 Drawing Sheet

INTEGRATED POWER PLANT AND SYSTEM AND METHOD INCORPORATING THE SAME

BACKGROUND

Figure 1:
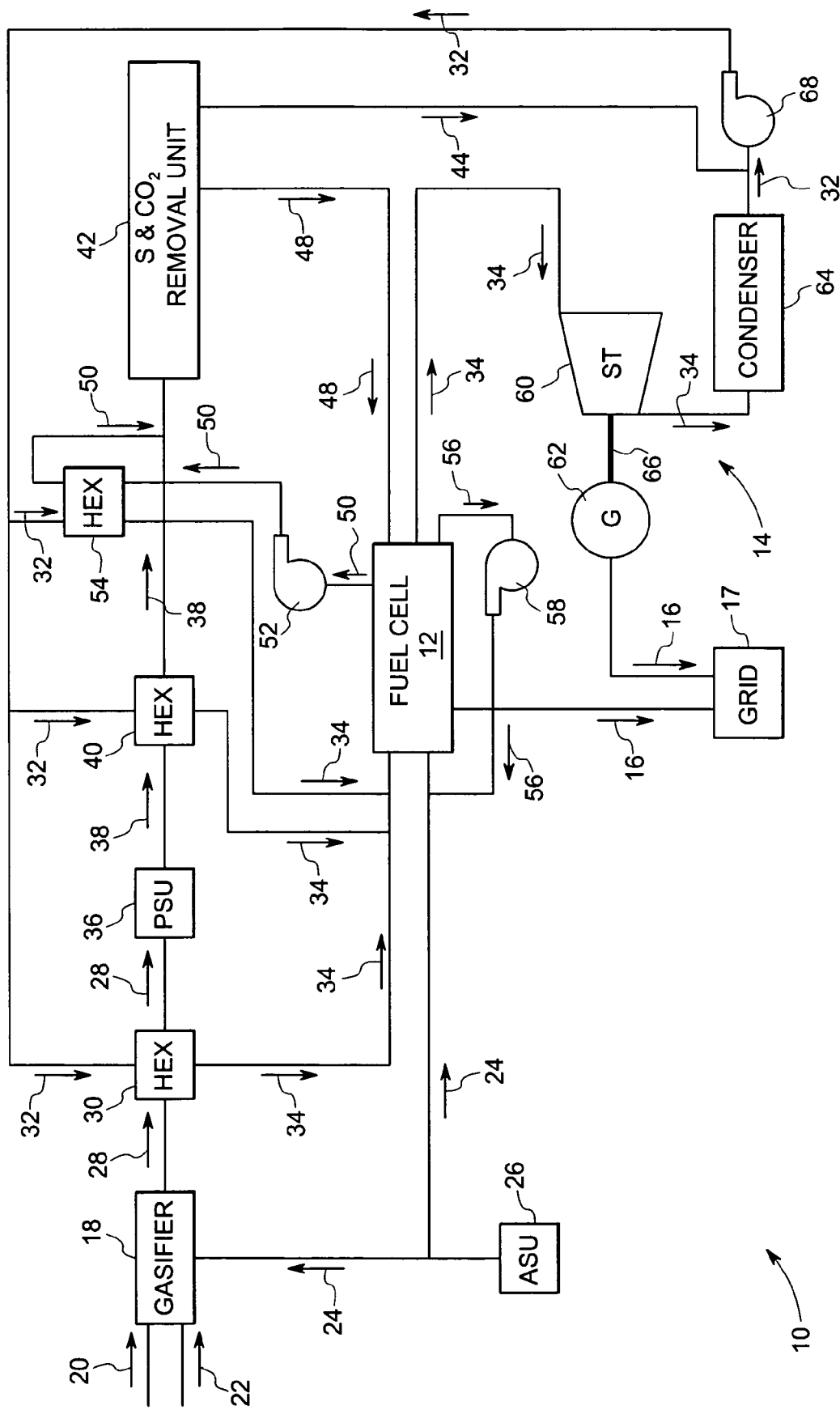

The invention relates generally to power plants producing electricity from coal or other solid or low grade liquid fuels and more specifically to an integrated gasification power plant including a fuel cell and a steam turbine power plant.

A variety of different systems have been used to generate electrical power from coal and low grade fuels. One such system is an integrated gasification gas turbine combined cycle power plant (IGCC). In this system a conventional gas turbine combined cycle power plant utilizes combustion of the gasified fuel to induce rotation of gas turbine blades coupled to a shaft that is coupled to a generator. The generator converts the rotational energy produced by the turbine into electrical energy. The fuel for combustion in the turbine may be provided by a gasifier, which produces a gaseous fuel from a solid fuel, such as coal or other solid or low grade liquid fuels (e.g. biomass, heavy oils). The exhaust waste heat can be recovered in a bottoming steam turbine system.

In addition, fuel cells have been integrated with conventional gas turbines to improve the efficiency of the power plant. Fuel cells typically cause a reaction between a fuel, such as hydrogen, and an oxidant, such as air, which produces electrical power. The fuel cells also produce hot gases that may be mixed with the fuel for combustion in the gas turbine, which improves the efficiency of the system. In addition, integration of a fuel cell into a conventional IGCC plant is a possibility.

However, all these types of power plants have several disadvantages. For example, a typical gasifier combined cycle power plant has a low thermal efficiency, approximately 40 percent. Furthermore, there may be a large amount of carbon dioxide produced by the gasifier in addition to the fuel. However, removing the carbon dioxide from the fuel before the fuel is combusted in order to reduce carbon dioxide emissions significantly reduces the performance of the system. Furthermore, the fuel cells that are used in such plants do not consume all of the fuel that is fed into the fuel cell, thereby reducing the efficiency of the system.

Therefore, it is desirable to provide a power plant with greater efficiency and with reduced emissions. The techniques described below may provide a solution to one or more of the problems described above.

BRIEF DESCRIPTION

In one aspect of the present technique, a system for producing electricity is provided. The system comprises a fuel cell and a steam turbine. The fuel cell is operable to produce electricity from a reaction between a fuel gas and an oxidant. The steam turbine is coupled to the fuel cell to receive steam heated by the fuel cell.

In another aspect, a method of producing electricity is provided. The method comprises operating a fuel cell to produce electricity, wherein the fuel cell is cooled by steam. The method further comprises using the steam from the fuel cell to drive a steam turbine coupled to an electrical generator.

In yet another aspect, a system for producing electricity is provided. The system comprises a gasifier and a fuel cell. The gasifier is operable to produce a fuel gas from a solid fuel for reaction in the fuel cell. The fuel cell is operable to receive the fuel gas from the gasifier and to produce electricity from a reaction between the fuel gas and an oxidant, wherein unreacted fuel gas from the fuel cell is recirculated through the fuel cell.

In still another aspect of the present technique, an integrated power plant is provided, which comprises an air separation unit, and a fuel cell. The air separation unit is operable to produce a supply of oxygen from air. The fuel cell is coupled to the air separation unit, wherein oxygen from the air separation unit is coupled to the fuel cell assembly to react with a fuel to produce electricity.

In still another aspect, a method of operating a power plant to produce electricity is provided. The method comprises operating an air separation system to produce oxygen from air. The method further comprises operating a fuel cell assembly to produce electricity by reacting a fuel with the oxygen from the air separation system.

In still another aspect of the present technique, an electrical power generating system is provided. The system comprises a gasifier and a fuel cell. The gasifier is operable to produce a fuel gas from a solid fuel. The fuel cell is operable to receive the fuel gas from the gasifier and to produce electricity from a reaction between the fuel gas and an oxidant. The system further comprises a sulphur and carbon dioxide removal system from, for removing sulphur and carbon dioxide the fuel gas prior to entering the fuel cell.

DRAWINGS

These and other features, aspects, and advantages of the present invention will become better understood when the following detailed description is read with reference to the accompanying drawings in which like characters represent like parts throughout the drawings, wherein:

FIG. 1 is a schematic diagram of an exemplary integrated power plant in accordance with present techniques.

DETAILED DESCRIPTION

Referring now to FIG. 1, an exemplary integrated power plant 10 comprising a fuel cell 12 and a steam turbine system 14 is illustrated. In this embodiment, the fuel cell 12 and the steam turbine system 14 are each operable to supply electricity 16 to an electrical grid 17. The illustrated power plant 10 also comprises a gasifier 18. The gasifier 18 is supplied with coal 20 and steam 22 for reaction therein. In addition, in the illustrated embodiment, the gasifier 18 receives oxygen 24 from an air separation unit (ASU) 26 that separates the oxygen 24 from nitrogen and other gaseous components of air. The reaction in the gasifier 18 involves a multi-stage combustion of coal 20 in the presence of steam 22 and oxygen 24 to produce a fuel 28 comprising hydrogen and carbon monoxide for the fuel cell 12.

The use of substantially pure oxygen 24 in the gasifier 18 is more desirable than the use of air. Atmospheric air has a relatively high concentration of nitrogen, which is largely un-reacted in the gasifier 18. Thus, the fuel 28 supplied by the gasifier 18 and oxygen 24 supplied to the fuel cell 12 contain an amount of nitrogen, which, over a period of time, accumulates over various system components, thereby lowering system performance. In such systems, it is necessary to have means to extract (bleed) the nitrogen from the spent fuel 50 and spent oxygen 56 (bleed not shown)

In the illustrated embodiment, the fuel 28 produced by the gasifier 18 is directed along a flow path toward a heat exchanger 30. The fuel 28 flows through one flow path through the heat exchanger 30 while liquid water 32 exhausted from the steam turbine system 14 flows through another flow path through the heat exchanger 30. Inside the heat exchanger 30 heat is transferred from the fuel 28 to the liquid water 32 without mixing the fuel 28 and the water 32. As a result, the liquid water 32 exits the heat exchanger 30 as steam 34.

As described earlier, the fuel 28 produced by the gasifier 18 is primarily hydrogen and carbon monoxide. In addition, the fuel 28 may also comprise sulphur and particulate impurities, such as mercury (Hg). Preferably, these impurities are removed from the fuel 28 before the fuel 28 is utilized in the fuel cell 12. In the illustrated embodiment, the fuel 28 is directed through a particle separation unit (PSU) 36 that is operable to remove these particulate impurities from the fuel 28. The PSU 36 may have a cyclone separator, a high temperature ceramic filter, or another device for particulate removal. The fuel free of particulate impurities 38 may be directed toward another heat exchanger 40, which is similar in operation to the previously discussed heat exchanger 30. Thus heat exchanger 40 includes isolated flow paths for fuel 38 and liquid water 32 exhausted from the steam turbine system 14.

In the illustrated embodiment, the fuel 38 flowing from the heat exchanger 40 is directed toward a sulphur and carbon dioxide removal unit 42 for sequestration of sulphur and carbon dioxide from the fuel 38. Various techniques of de-sulphurizing may be used for the separation of sulphur from the fuel 38. In one exemplary technique, the fuel 38 can be made to flow through a vessel containing a bed of sulphur absorbent. Likewise, various techniques may be used for the separation of carbon dioxide from the fuel 38, including but not limited to pressure swing adsorption, chemical absorption and membrane separation. A certain amount of water 44 may be removed from the fuel 38 in the process, and may be advantageously directed toward the inlet of a water pump 68. The water pump 68 is used to pump condensate from the steam turbine system 14 to the aforementioned heat exchangers 30 and 40. After the removal of sulphur and carbon dioxide, the fuel free of sulphur and carbon dioxide 48 largely comprises hydrogen and carbon monoxide, with lesser amounts of water and carbon dioxide, and is hereinafter referred to as fresh fuel 48. The fresh fuel 48 is directed into the fuel cell 12 for reaction therein.

The fuel cell 12 may comprise a plurality of fuel cells that are coupled together to form the fuel cell 12. A fuel cell 12 is an energy conversion device that produces electricity by electrochemically combining the fuel 48 with the oxygen 24 across an ion conduction layer. More particularly, the fuel cell 12 comprises an anode, a cathode, and an electrolyte (not shown). In the fuel cell 12, the hydrogen and oxygen react to produce water and electricity. Electrochemical conversion of carbon monoxide to carbon dioxide is another mechanism that also produces electricity. In an exemplary embodiment, the fuel cell assembly 12 comprises a plurality of solid oxide fuel cell (SOFC) units with an oxygen-ion conducting solid electrolyte, such as yttria stabilized zirconia (YSZ), ceria-doped zirconia, or lanthanum strontium gallium manganate. In alternative embodiments, the fuel cell 12 may comprise, for example, molten carbonate electrolytes or other known electrolyte materials suitable for use in the fuel cell 12.

The products of the reaction in the fuel cell 12 are primarily water and carbon dioxide. However, there is an amount of unreacted hydrogen and carbon monoxide that is also present. The unreacted hydrogen and carbon monoxide is referred to hereinafter as spent fuel 50 and is directed away from the fuel cell 12 by a fuel pump 52.

In the illustrated embodiment, the spent fuel 50 is recirculated back through the fuel cell 12. The spent fuel 50 is mixed with the fresh fuel 38 from the gasifier 18 at the inlet to the sulphur and carbon dioxide removal unit 42. The heat generated by the operation of the fuel cell 12 raises the temperature of the spent fuel 50. In this embodiment, a heat exchanger 54 is provided to transfer heat from the spent fuel 50 to the liquid water 32 from the steam turbine system 14. Recycling the un-reacted fuel from the fuel cell 12 enables the power plant 10 to have a greater efficiency. The efficiency is also improved by the recovery of the heat generated by the fuel cell 12.

Similarly, the oxygen 56 that is not consumed in the fuel cell 12 is recirculated back through the fuel cell 12. A pressure-increasing device, such as blower 58, is used to raise the pressure of the exhaust oxygen, which is fed back into the fuel cell 12 along with the fresh oxygen 24 from the ASU 26. Mixing of re-circulated oxygen 56 exhausted from the fuel cell 12 with fresh oxygen 24 is advantageous in several respects. Namely, it improves the overall efficiency of the power plant 10. In addition, recirculating hot exhaust oxygen 56 from the fuel cell 12 and mixing it with fresh oxygen 24 from the ASU 26 raises the temperature of the oxygen 24 prior to entering the fuel cell 12, which improves the efficiency of the reaction within the fuel cell 12.

As opposed to conventional air-cooled fuel cells, the illustrated fuel cell 12 utilizes steam 34 from the various heat exchangers to cool the fuel cell 12. The steam 34 flows along an isolated flow path through the fuel cell 12, wherein heat from the fuel flow 12 is transferred to the steam 34. As a result, the steam 34, the steam flowing from the fuel cell 12 is raised to a higher temperature. The heated steam 34 is directed toward the steam turbine system 14.

The steam turbine system 14 uses the steam from the fuel cell 12 to produce electricity. The steam turbine system 14 comprises a steam turbine 60, a generator 62, and a condenser 64. The steam 34 from the fuel cell 12 is used to cause turbine blades within the steam turbine 60 to rotate a shaft 66. The shaft 66 is coupled to the generator 62. The mechanical rotational energy produced by the steam turbine 60 is converted into electrical energy by the generator 62. The electricity 16 produced by the generator 62 and the fuel cell 12 is coupled to a distribution power supply network, represented generally as grid 17.

The steam 34 exhausted from the steam turbine 60 is condensed into a liquid condensate 32 in the condenser 64. The water pump 68 is used to pump the condensate 32 to the heat exchangers 30, 40, and 54, wherein, as described above, the condensate 32 is heated to steam for delivery to the fuel cell 12.

The techniques described above improve power plant efficiency by recycling oxidant and fuel streams exhausted from the fuel cell portion to extract as much work as possible from the oxidant and fuel streams. In addition, heat generated by the fuel cell is used to provide steam for a steam turbine, further improving the efficiency of the system. Although the illustrated embodiment shows a number of features, many of the features have individual benefits and are not dependent upon the other features.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for producing electricity, comprising:
a gasifier operable to produce a fuel gas from a solid fuel for reaction in a fuel cell;
a fuel cell operable to receive the fuel gas from the gasifier and to produce electricity from a reaction between the fuel gas and an oxidant, wherein unreacted fuel gas from the fuel cell is recirculated through the fuel cell; and a heat exchanger operable to transfer heat from the unreacted fuel gas from the fuel cell to a liquid water stream to produce steam.

2. The system as recited in claim 1, wherein the fuel cell comprises a plurality of solid oxide fuel cells.

3. The system as recited in claim 1, comprising a carbon dioxide removal device, wherein the fuel gas from the gasifier is directed through the carbon dioxide removal device prior to entering the fuel cell.

4. The system as recited in claim 3, wherein the unreacted fuel from the fuel cell is mixed with fuel gas from the gasifier and directed through the carbon dioxide removal device prior to re-entering the fuel cell.

5. The system as recited in claim 1, comprising a device operable to separate oxygen from air, wherein the oxygen is directed to at least one of the gasifier to facilitate the production of fuel gas and the fuel cell to serve as the oxidant.

6. The system as recited in claim 5, wherein unreacted oxygen from the fuel cell is mixed with oxygen from the device and recirculated through the fuel cell.

\* \* \* \* \*